Patented Nov. 14, 1922.

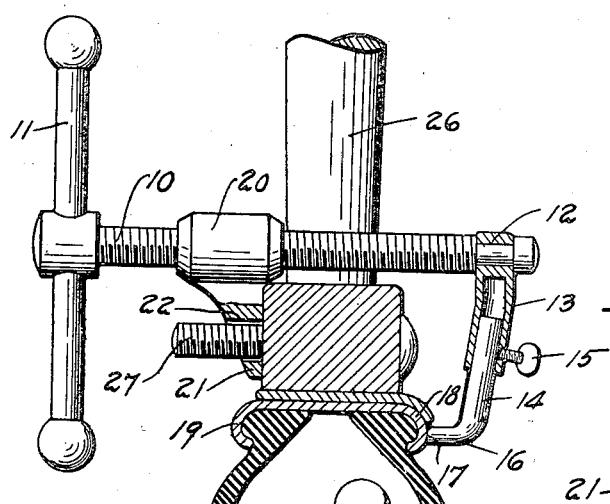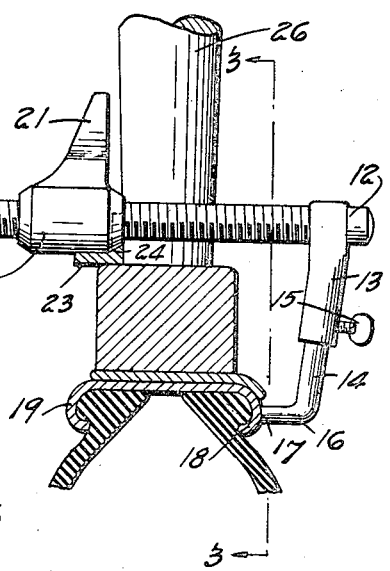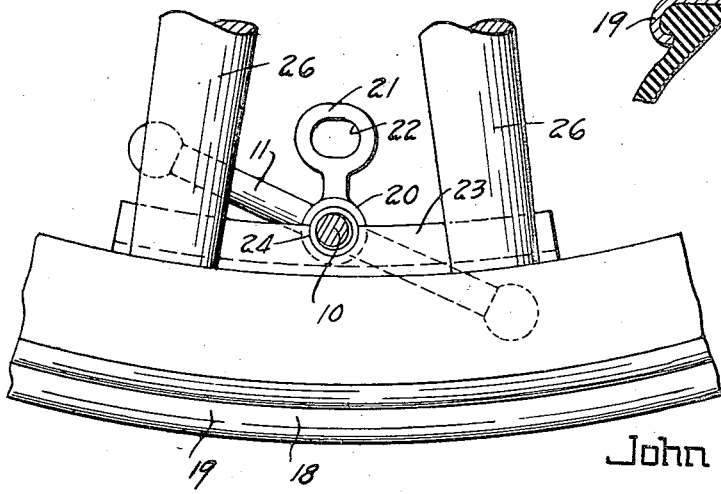

1,435,624

UNITED STATES PATENT OFFICE.

JOHN SCHWAB, OF CHICAGO, ILLINOIS.

TIRE REMOVER.

Application filed May 6, 1922. Serial No. 558,896.

*To all whom it may concern:*

Be it known that I, JOHN SCHWAB, a citizen of the United States, residing at Chicago, in the county of Cook and State of Illinois, have invented certain new and useful Improvements in Tire Removers, of which the following is a specification, reference being had to the accompanying drawings.

This invention relates to improvements in tire removers, and more particularly to a device for removing tires mounted upon demountable rims together with the rim thereof from the wheel upon which they are employed.

An important object of the invention is to provide a device of this character which is readily adjustable and adaptable for use with different types of wheels.

A still further object of the invention is to provide a device of this character which is adjustable to compensate for various thicknesses of wheel fellies about which the device operates.

A still further object of the invention is to provide means for removing a tire having means for normally engaging the felly together with means for engaging the spokes for use in connection with wheels, the fellies of which do not offer the proper seating point for the device.

An additional object of the invention is to provide a device of this character which is simple in construction and arrangement, durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:

Figure 1 is a sectional view partially in elevation showing a tire remover constructed in accordance with my invention;

Figure 2 is a similar view showing a different manner of employing the tool; and Figure 3 is a section on the line 3—3 of Figure 2.

Referring now more particularly to the drawings, the numeral 10 designates a threaded shaft, one end of which is provided with an operating lever 11 by means of which the shaft may be rotated and the other end of which has rotatably engaged therewith, as at 12, an end of a socket member 13. This socket member forms one part of a coupling, the other part of which is formed by an arm 14 fitting within the socket and held in adjusted position therein by means of a set screw 15. This arm 14 is provided with an angular extension 16 adapted at its end, as at 17, for engagement with the flange 18 of a demountable rim 19.

Mounted upon the shaft 10 is a nut 20 provided at one side with an angular extension 21 having formed therein a slot 22, the purpose of which will hereinafter appear. The numeral 23 designates an angle bar which is arcuately curved and which is provided through its central portion with a notch or opening 24 adapted for the reception of the nut 20 hereinbefore mentioned. This bar will be of sufficient length to extend between the adjacent spokes 26 of a wheel and the curvature thereof will permit of arrangement of the bar immediately adjacent the felly of the wheel.

In the use of my device, where the wheel to which the tire is applied is provided with removable clamping portions mounted upon bolts 27, the clamping portions are removed and the slot 22 of the extension 21 of the nut 20 engaged with one of the bolts. The arm 14 is then adjusted in its socket until the end portion 17 thereof engages against the flange 18 of the demountable rim 19 and the arm secured in position, subsequently to which the tire and rim may be removed by rotating the shaft 10 through medium of the lever 11 which may consist either of a straight bar or a hand wheel or the like. In some types of wheels the clamps by means of which the demountable rim is held in position are not removable, and for use in wheels of this construction I have provided the bar 23 hereinbefore described. In employing this bar, the same is placed against adjacent spokes of the wheel and the nut 20 rotated so that the extension thereof is directed inwardly from the felly so that it will not engage thereagainst. The shaft is then adjusted so that the nut abuts against the bar 23 at the sides of the opening 24 thereof, the arm 14 adjusted and the removal operation performed as hereinbefore stated.

From the foregoing it is believed to be obvious that a tire remover constructed in accordance with my invention is particularly well adapted for the use for which it is intended by reason of the fact that it may be readily adjusted to compensate for various widths and thicknesses of fellies and may be applied for use in conjunction with various types of fellies upon which the ordinary tire remover will prove ineffective. It will furthermore be obvious that the construction as hereinbefore set forth is capable of some change and modification without materially departing from the spirit of my invention and I accordingly do not limit myself thereto except as hereinafter claimed.

I claim:

1. In a tire and demountable rim remover for wheels comprising a threaded shaft, a nut engaged with said shaft and embodying an extension having a slot formed therein, means for rotating the shaft, and a member rotatably engaged with an end portion of the shaft and embodying an angular foot adapted for engagement with the flange of a rim, said member comprising relatively adjustable parts and means for maintaining the parts in adjusted relation.

2. In a tire remover, the combination with a threaded shaft, of a member adapted for engagement with the felly of a wheel and having a threaded opening through which the shaft is directed, a socket member rotatably engaged with the end of said shaft, and an arm adjustable in said socket provided with an angular extension adapted for engagement with a rim.

3. In a tire remover, a threaded shaft, a nut engaged with said shaft and provided with means for holding the same against rotation, an arcuate plate adapted for engagement with adjacent spokes of the wheel and having an opening therein through which the shaft may be directed, said nut engaging said plate at the sides of the opening, and an adjustable member rotatably engaged with the end of the shaft and having an angular extension adapted for engagement with the flange of a rim.

In testimony whereof I hereunto affix my signature.

JOHN SCHWAB.